United States Patent
Dupont et al.

(10) Patent No.: US 11,803,678 B2
(45) Date of Patent: Oct. 31, 2023

(54) DISENTANGLEMENT FOR INFERENCE ON SEISMIC DATA AND GENERATION OF SEISMIC DATA

(71) Applicant: Schlumberger Technology Corporation, Sugar Land, TX (US)

(72) Inventors: Emilien Dupont, Los Altos, CA (US); Jose Celaya Galvan, Sunnyvale, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 602 days.

(21) Appl. No.: 17/045,705

(22) PCT Filed: Apr. 12, 2019

(86) PCT No.: PCT/US2019/027148
§ 371 (c)(1),
(2) Date: Oct. 6, 2020

(87) PCT Pub. No.: WO2019/200207
PCT Pub. Date: Oct. 17, 2019

(65) Prior Publication Data
US 2021/0165939 A1 Jun. 3, 2021

Related U.S. Application Data

(60) Provisional application No. 62/656,717, filed on Apr. 12, 2018.

(51) Int. Cl.
| | |
|---|---|
| *G06F 30/27* | (2020.01) |
| *G01V 1/18* | (2006.01) |
| *G01V 1/28* | (2006.01) |
| *G01V 1/30* | (2006.01) |

(Continued)

(52) U.S. Cl.
CPC .............. *G06F 30/27* (2020.01); *G01V 1/181* (2013.01); *G01V 1/282* (2013.01); *G01V 1/30* (2013.01);
(Continued)

(58) Field of Classification Search
CPC .. G06F 30/27; G06F 2111/10; G06F 2113/08; G01V 1/181; G01V 1/282;
(Continued)

(56) References Cited

U.S. PATENT DOCUMENTS

| | | |
|---|---|---|
| 2013/0118736 A1 | 5/2013 | Usadi et al. |
| 2014/0278311 A1 | 9/2014 | Dimitrov et al. |

(Continued)

FOREIGN PATENT DOCUMENTS

WO 2018031051 A1 2/2018

OTHER PUBLICATIONS

Higgins et al., "Early visual concepts learning with unsupervised deep learning", 2016.*

(Continued)

*Primary Examiner* — Kandasamy Thangavelu
(74) *Attorney, Agent, or Firm* — Jeffrey D. Frantz

(57) ABSTRACT

A method, apparatus, and program product utilize a disentangled factor learning framework to analyze petro-technical image data such as seismic image data to infer properties of a subsurface volume and/or to generate image data for use in training machine learning algorithms for use in petro-technical applications.

20 Claims, 7 Drawing Sheets

(51) Int. Cl.
  *G06F 113/08* (2020.01)
  *G06F 111/10* (2020.01)
(52) U.S. Cl.
  CPC .. *G01V 2210/1425* (2013.01); *G01V 2210/66* (2013.01); *G06F 2111/10* (2020.01); *G06F 2113/08* (2020.01)
(58) Field of Classification Search
  CPC ............. G01V 1/30; G01V 2210/1425; G01V 2210/66; G01V 1/302; G01V 2210/1429; G06N 3/045; G06N 3/047; G06N 3/088
  See application file for complete search history.

(56) References Cited

U.S. PATENT DOCUMENTS

2016/0313463 A1    10/2016  Wahrmund et al.
2018/0088252 A1     3/2018  Borrel et al.
2019/0170888 A1*    6/2019  Halpert ................. G01V 1/282

OTHER PUBLICATIONS

Burgess et al., "Understanding disentangling in β-VAE", 2018.*
Ghosh, Ushasi, "Extracting underlying geological structure from seismic data using data mining techniques", Aug. 2014.*
Kim et al., "Unsupervised Visual attribute transfer with Reconfigurable Generative Adversarial Networks", 2017.*
Chen et. al., 2016, InfoGAN: Interpretable Representation Learning by Information Maximizing Generative Adversarial Nets (14 pages).
Higgins et al., (2017) β-VAE: Learning Basic Visual Concepts With a Constrained Variational Framework, Published as a conference paper at ICLR 2017 (22 pages).
International Search Report and Written Opinion issued in the PCT application PCT/US2019/027148, dated Aug. 7, 2019 (10 pages).
International Preliminary Report on Patentability issued in the PCT application PCT/US2019/027148, dated Oct. 22, 2020 (7 pages).

* cited by examiner

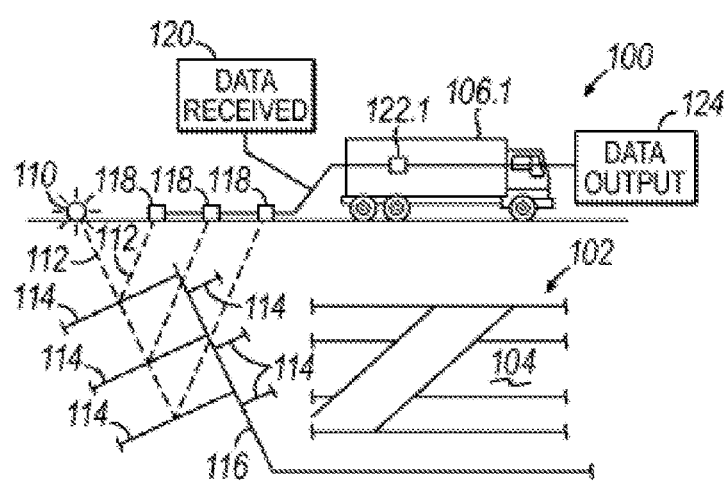
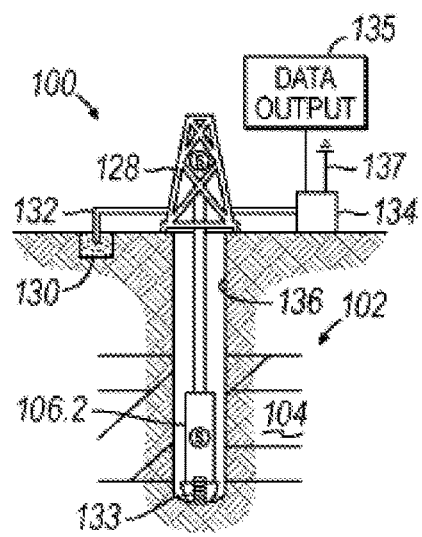
FIG. 2A   FIG. 2B
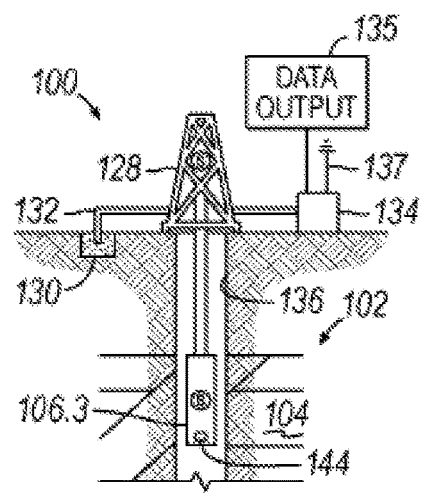
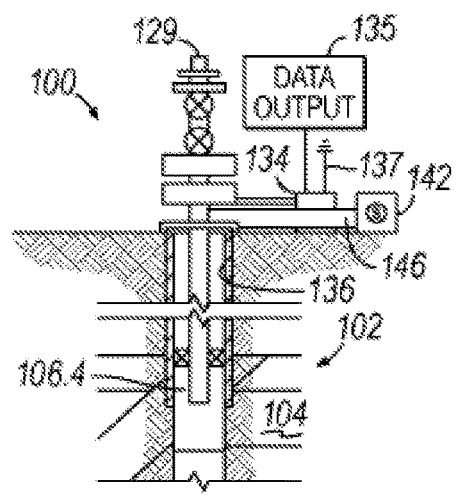
FIG. 2C   FIG. 2D

DISENTANGLEMENT FOR INFERENCE ON SEISMIC DATA AND GENERATION OF SEISMIC DATA

CROSS REFERENCE PARAGRAPH

This application claims the benefit of U.S. Provisional Application No. 62/656,717, entitled "DISENTANGLEMENT FOR INFERENCE ON SEISMIC DATA AND GENERATION OF SEISMIC DATA," filed Apr. 12, 2018, the disclosure of which is hereby incorporated herein by reference.

BACKGROUND

Reservoir modeling and simulation are commonly used in the oil & gas industry to model the structure and/or properties of a subsurface formation, e.g., of the type containing recoverable hydrocarbons. Reservoir modeling and simulation may be used during various phases of exploration and production, including, for example, to attempt to predict the location, quantity and/or value of recoverable hydrocarbons, to plan the development of wells for cost-effectively extracting hydrocarbons from the subsurface formation, and to guide future and/or ongoing production and development decisions.

Reservoir modeling and simulation may be challenging due to the fact that data gathering techniques such as seismic surveys and well logging may provide an incomplete picture of the structure and other properties of a subsurface formation, particularly when a subsurface formation is highly faulted and/or otherwise of a complex structure. As a result, despite the increasing sophistication of computer modeling techniques, manual interpretation of collected data by skilled personnel is still relied upon in many circumstances to generate structural information representing the structure of the geological layers running through a subsurface formation. For example, determining the locations of geological layers within a subsurface formation generally involves manual interpretation of seismic survey data and/or well log data to identify common patterns in the data at different locations in the subsurface formation that indicate where a given geological layer is distributed throughout the subsurface formation. In some computer models, geological layers are represented by the surfaces between adjoining geological layers, which are generally referred to as horizons.

SUMMARY

The embodiments disclosed herein provide a method, apparatus, and program product that utilize a disentangled factor learning framework to analyze petro-technical image data such as seismic image data to infer properties of a subsurface volume and/or to generate image data for use in training machine learning algorithms for use in petro-technical applications.

Therefore, consistent with one aspect of the invention, a method may include receiving a set of petro-technical image data representative of a subsurface volume, and applying a disentangled factor learning algorithm to the set of petro-technical image data to create a disentangled representation model.

In some embodiments, the set of petro-technical image data includes seismic image data collected from the subsurface volume. Also, in some embodiments, the seismic image data is two dimensional seismic image data. Further, in some embodiments, the seismic image data is three dimensional seismic image data.

In some embodiments, the disentangled factor learning algorithm uses a general adversarial network. In addition, in some embodiments, the disentangled factor learning algorithm uses a variational autoencoder.

In some embodiments, the disentangled representation model defines a plurality of disentangled representations representative of petro-technical attributes of the subsurface volume. In addition, in some embodiments, at least one disentangled representation is a discrete disentangled representation and at least one disentangled representation is a continuous disentangled representation. Moreover, in some embodiments, a first disentangled representation among the plurality of disentangled representations is representative of a salt content. In some embodiments, a first disentangled representation among the plurality of disentangled representations is representative of a content of a rock facies.

Some embodiments may also include processing new petro-technical image data using the disentangled representation model. Moreover, in some embodiments, processing the new petro-technical image data using the disentangled representation model includes determining values for one or more generative factors for the new petro-technical image data using the disentangled representation model. Some embodiments may also include generating new training data using the disentangled representation model.

Some embodiments may also include an apparatus including at least one processing unit and program code configured upon execution by the at least one processing unit to perform any of the aforementioned operations, as well as a program product including a computer readable medium and program code stored on the computer readable medium and configured upon execution by at least one processing unit to perform any of the aforementioned operations.

In some embodiments, the disentangled factor learning algorithm uses a variational autoencoder with a joint latent distribution to learn disentangled continuous and discrete representations in an unsupervised manner. In addition, in some embodiments, the disentangled factor learning algorithm uses an objective function:

$$\mathcal{L}(\theta,\phi) = \mathbb{E}_{q_\phi(z,c|x)}[\log p_\theta(x|z,c)] - \gamma|\beta D_{KL}(q_\phi(z|x)\|p(z)) - C_z| - \gamma|\beta D_{KL}(q_\phi(c|x)\|p(c)) - C_c|,$$

where z is a set of continuous latent variables, c is a set of discrete latent variables, $q_\phi(z|x)$ is a posterior neural network with parameters $\phi$ mapping x into z, $q_\phi(c|x)$ is a posterior neural network with parameters $\phi$ mapping x into c, $p_\phi(x|z,c)$ is a likelihood neural network with parameters $\phi$ mapping z and c into x, $p(z)$ and $p(c)$ are priors, $D_{KL}$ is a divergence term, $\beta$ is a positive constant, and $\gamma$, $C_c$ and $C_z$ are hyperparameters. In addition, in some embodiments, the disentangled factor learning algorithm includes a first divergent term having a first capacity for continuous latent variables and a second divergent term having a second capacity for discrete latent variables. Moreover, in some embodiments, the discrete latent variables and the continuous latent variables are parameterized. Further, in some embodiments, the discrete latent variables are parameterized using a reparameterization technique.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 2A-2D illustrate simplified, schematic views of an oilfield having subterranean formations containing reservoirs therein in accordance with implementations of various technologies and techniques described herein.

DETAILED DESCRIPTION

The herein-described embodiments provide a method, apparatus, and program product that a disentangled factor learning framework to analyze petro-technical image data such as seismic data to infer properties of a subsurface volume and/or to generate image data for use in training machine learning algorithms for use in petro-technical applications. Prior to discussing these concepts, however, an overview of an example hardware and software environment, as well as of oilfield operations, are discussed herein.

Hardware and Software Environment

Figure 1:
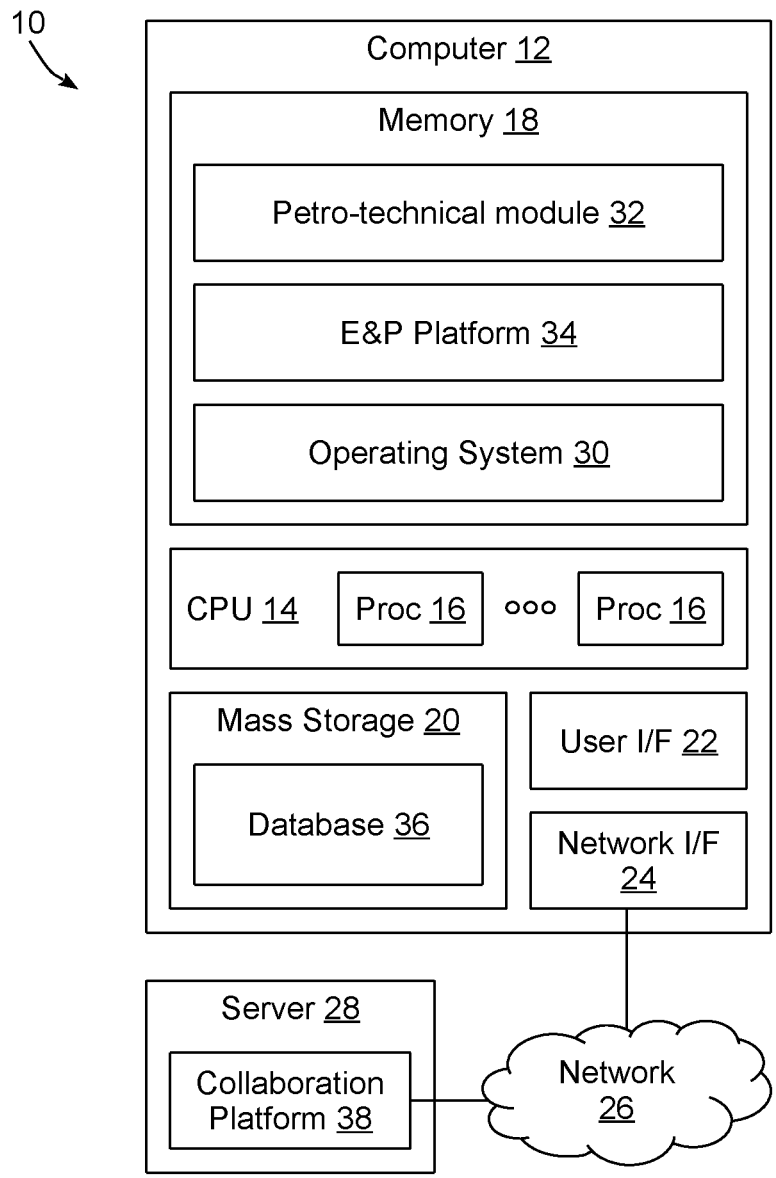
FIG. 1 is a block diagram of an example hardware and software environment for a data processing system in accordance with implementation of various technologies and techniques described herein.

Turning now to the drawings, wherein like numbers denote like parts throughout the several views, FIG. 1 illustrates an example data processing system 10 in which the various technologies and techniques described herein may be implemented. System 10 is illustrated as including one or more computers 12, e.g., client computers, each including a central processing unit (CPU) 14 including at least one hardware-based processor or processing core 16. CPU 14 is coupled to a memory 18, which may represent the random access memory (RAM) devices comprising the main storage of a computer 12, as well as any supplemental levels of memory, e.g., cache memories, non-volatile or backup memories (e.g., programmable or flash memories), read-only memories, etc. In addition, memory 18 may be considered to include memory storage physically located elsewhere in a computer 12, e.g., any cache memory in a microprocessor or processing core, as well as any storage capacity used as a virtual memory, e.g., as stored on a mass storage device 20 or on another computer coupled to a computer 12.

Each computer 12 also generally receives a number of inputs and outputs for communicating information externally. For interface with a user or operator, a computer 12 generally includes a user interface 22 incorporating one or more user input/output devices, e.g., a keyboard, a pointing device, a display, a printer, etc. Otherwise, user input may be received, e.g., over a network interface 24 coupled to a network 26, from one or more external computers, e.g., one or more servers 28 or other computers 12. A computer 12 also may be in communication with one or more mass storage devices 20, which may be, for example, internal hard disk storage devices, external hard disk storage devices, storage area network devices, etc.

A computer 12 generally operates under the control of an operating system 30 and executes or otherwise relies upon various computer software applications, components, programs, objects, modules, data structures, etc. For example, a petro-technical module or component 32 executing within an exploration and production (E&P) platform 34 may be used to access, process, generate, modify or otherwise utilize petro-technical data, e.g., as stored locally in a database 36 and/or accessible remotely from a collaboration platform 38. Collaboration platform 38 may be implemented using multiple servers 28 in some implementations, and it will be appreciated that each server 28 may incorporate a CPU, memory, and other hardware components similar to a computer 12.

In one non-limiting embodiment, for example, E&P platform 34 may implemented as the PETREL Exploration & Production (E&P) software platform, while collaboration platform 38 may be implemented as the STUDIO E&P KNOWLEDGE ENVIRONMENT platform, both of which are available from Schlumberger Ltd. and its affiliates. It will be appreciated, however, that the techniques discussed herein may be utilized in connection with other platforms and environments, so the invention is not limited to the particular software platforms and environments discussed herein.

In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIG. 1 is not intended to limit the invention. Indeed, those skilled in the art will recognize that other alternative hardware and/or software environments may be used without departing from the scope of the invention.

Oilfield Operations

FIGS. 2A-2D illustrate simplified, schematic views of an oilfield 100 having subterranean formation 102 containing reservoir 104 therein in accordance with implementations of various technologies and techniques described herein. FIG. 2A illustrates a survey operation being performed by a survey tool, such as seismic truck 106.1, to measure properties of the subterranean formation. The survey operation is a seismic survey operation for producing sound vibrations. In FIG. 2A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 2B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electro-magnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan.

Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 2C illustrates a wireline operation being performed by wireline tool 106.3 suspended by rig 128 and into wellbore 136 of FIG. 2B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 2D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2B-2D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2A-2D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
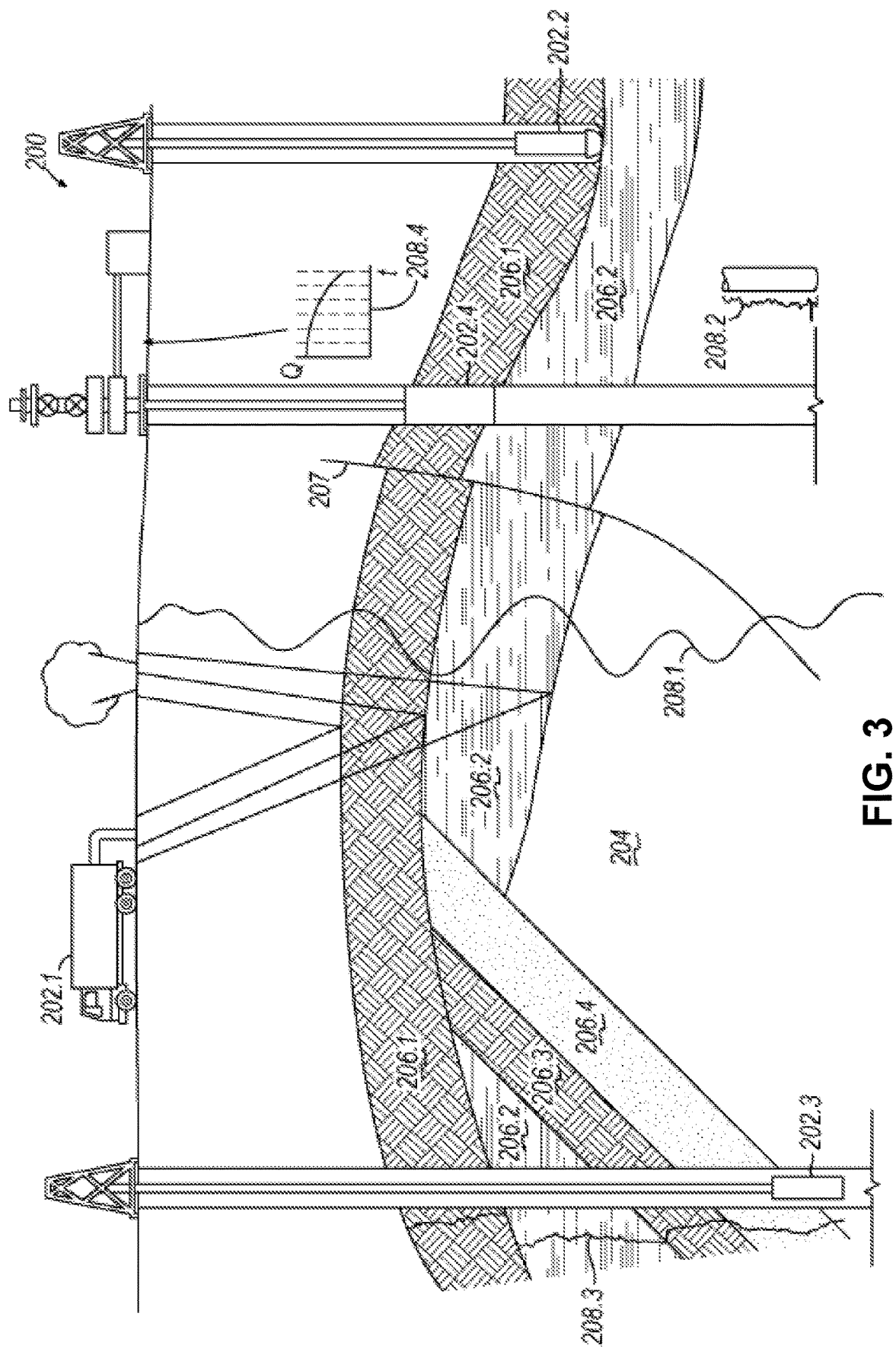
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2A-2D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 4:
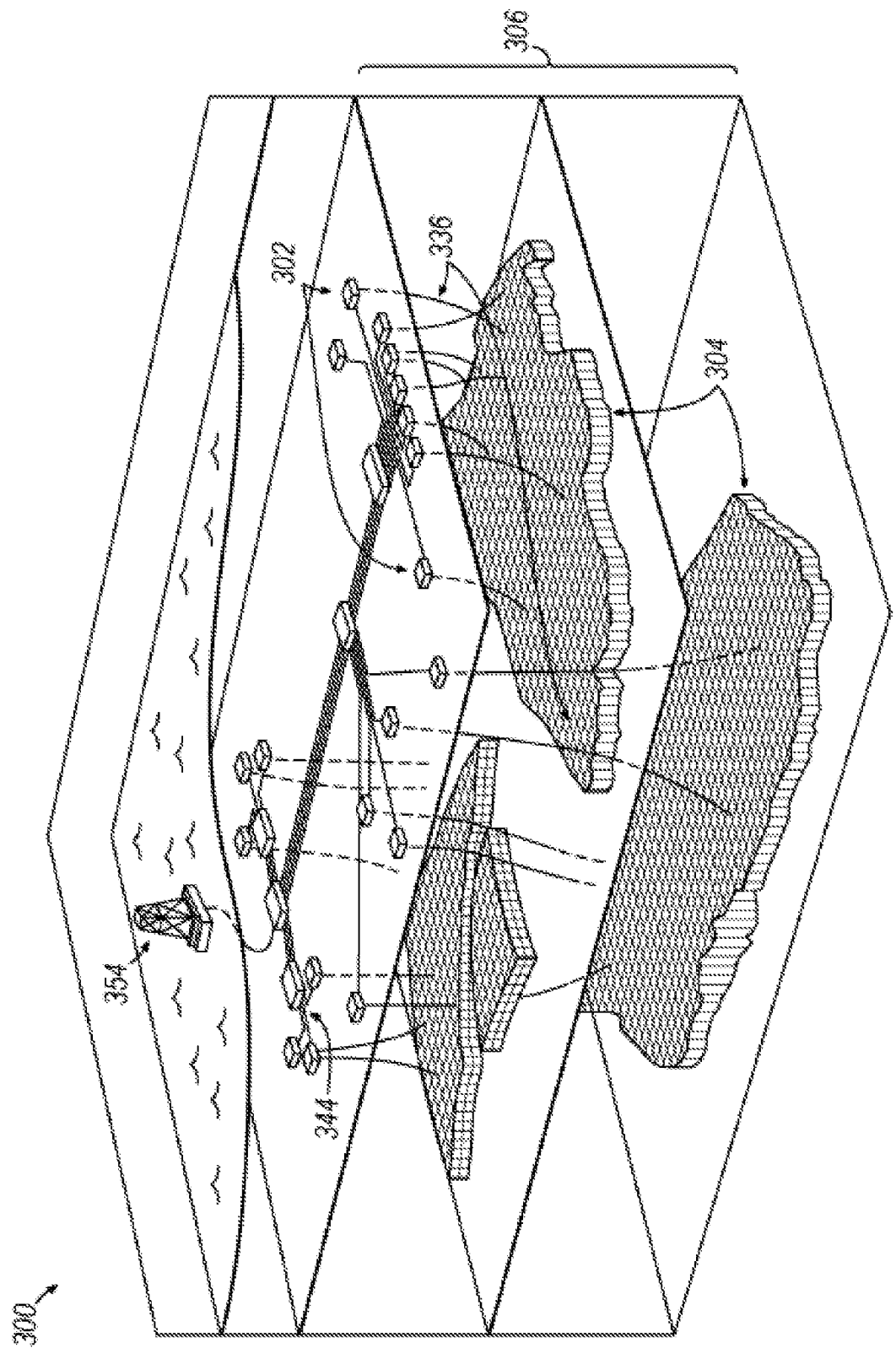
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Disentanglement for Inference on Seismic Data and Generation of Seismic Data

Embodiments consistent with the invention may use machine learning (ML) algorithms with disentanglement capabilities, e.g., as provided in a disentangled factor learning framework, to analyze seismic or other petro-technical image data of a subsurface volume for the purpose of inferring one or more generative factors for such image data and/or to generate petro-technical training data for use training purposes, and in some instances, both discrete and continuous generative factors.

In the context of computer vision, many conventional machine learning (ML) algorithms are generally trained on labelled data. For example, an ML algorithm may be used to learn to classify handwritten digits by training on a large number of human-labelled images of digits (e.g., an image depicting the digit nine may have the accompanying label "9"). Moreover, some conventional ML algorithms may be configured to learn to separate classes of data without the use of any labelled data, e.g., by being presented with a large number of images depicting handwritten digits, and clustering the images of digits into various digit types without any human labels applied to the images.

Some ML algorithms may also be used to disentangle images. In the context of handwritten digits, for example, disentanglement may enable an algorithm to learn to cluster images of handwritten digits by digit type while also recognizing the stroke thickness of a handwritten digit as well as how slanted it is, generally without the use of human labels and by looking at a large number of images. Such algorithms, in particular, may effectively learn the generative factors of the images.

Figure 5:
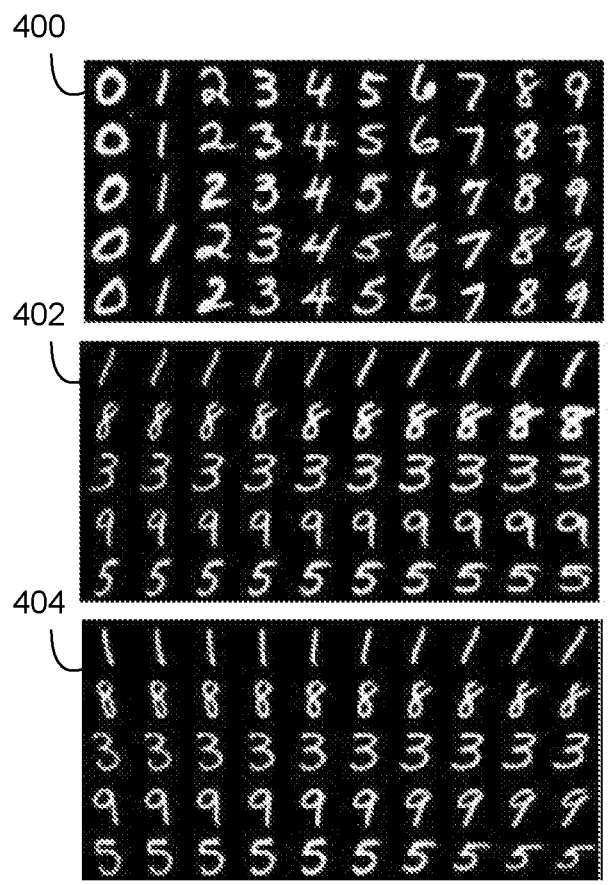
FIG. 5 illustrates examples of disentanglement of numerical digits.

When drawing a digit, for example, there are several generative factors that may be chosen to give rise to a final image. For example, when drawing a digit, the digit may vary (e.g., 0-9), but also, the writing utensil used (e.g., pen, marker, pencil) may vary, as may the slant of the digit based upon a writer's writing style. An ML algorithm that learns disentangled representations, for example, may analyze at a large number of images and discover these dimensions, or "generative factors," without any human knowledge, and thus may be able to take as input an image and output all the generative factors that led to the creation of that data. Thus, for an example input of an image of the digit seven, the output might be digit type="7", stroke thickness="0.3", and slant="12 degrees." Using disentanglement, an ML algorithm may be able to learn these factors without ever being made aware that there is such a thing as digit type or stroke thickness. Some examples of disentanglement are shown in FIG. 5, where a generative factor for digit type is shown at 400, a generative factor for stroke thickness is shown at 402, and a generative factor for slant is shown at 404. Notably, each representation 400, 402, 404 corresponds to varying a single generative factor, and some ML algorithms may be capable of discovering these dimensions without the use of any human information, i.e. without knowing that concepts such as digits or stroke thickness even exist. In many instances, learning disentangled representations also has an additional benefit of making some downstream machine learning tasks trivial. For example, classification on any generative factor generally becomes trivial when disentangled representations are determined.

Figure 6:
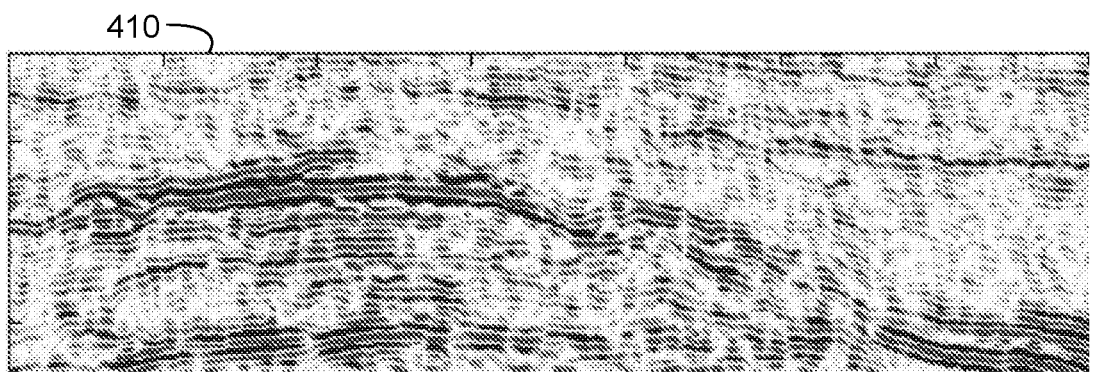
FIG. 6 illustrates an example seismic image of a portion of a subsurface volume.

In some embodiments consistent with the invention, unsupervised representation learning, and in particular, disentangled factor learning, is applied to petro-technical image data such as seismic data (e.g., as shown at 410 in FIG. 6) to determine one or more disentangled factors from the image data. Seismic data, as an example, may be interpreted as a set of images or 3D voxels, and the application of disentangled factor learning may be used to infer discrete and/or continuous properties or features of a subsurface volume, e.g., salt content or the content of various rock types in a seismic cube, generally in an unsupervised manner (i.e., without the use of labelled data). Furthermore, in some circumstances, such a framework may be used to generate more realistic looking seismic data for training other ML algorithms. Given that gathering seismic data for a subsurface volume such as a field or reservoir is generally very time consuming and expensive, an ability to generate realistic data for training ML models may provide substantial benefits in terms of cost and efficiency in various petro-technical applications.

In some embodiments, a disentangled factor learning algorithm may be used to analyze petro-technical image data such as 2D or 3D seismic data. Further, in some embodiments, the algorithm may be used to learn disentangled representations that are both continuous and discrete in a generally stable manner. Some conventional algorithms, for example, can only disentangle continuous representations; however, in the illustrated embodiments, a framework is provided for learning both continuous (e.g., for features such as stroke thickness, where a continuous range of values is supported) and discrete (e.g., for features such as digit type where a set of discrete values is supported) representations at the same time. The framework may employ a principled inference network of jointly continuous and discrete representations, thereby supporting both types (discrete and continuous) of generative factors.

The use of the herein-described disentangled factor learning framework may provide a number of technical advantages. For example, the generation of disentangled representations may allow for a more complete understanding of petro-technical image data of the data as it may learn many or all generative factors for the image data. Moreover, such a framework may allow for the generation of additional data, e.g., training data for other ML algorithms. Furthermore, the generative factors are generally human interpretable, and are thus more explainable than regular representations that can be abstract vectors of numbers.

Figure 7:
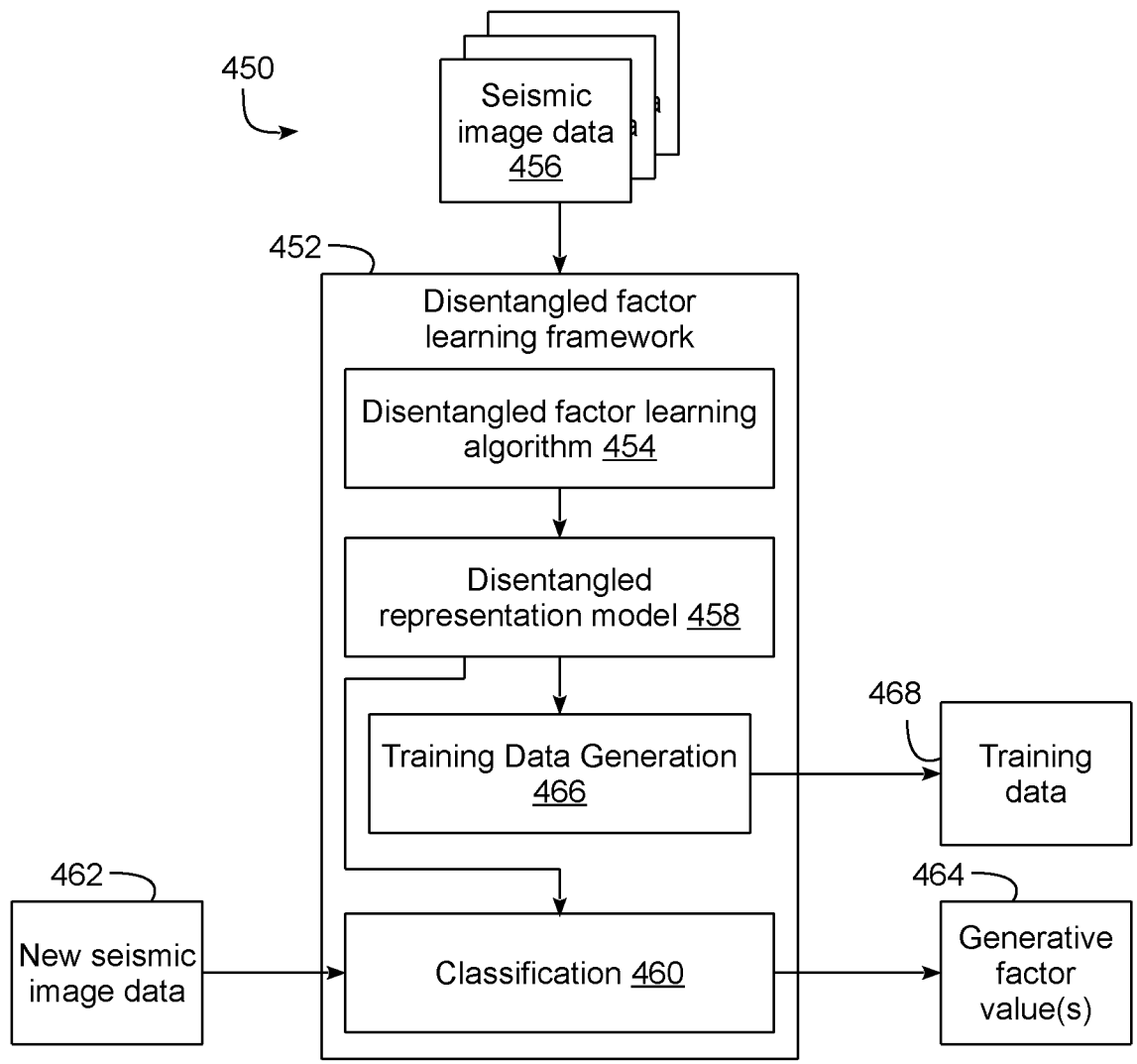
FIG. 7 is a block diagram illustrating an example disentangled factor learning network consistent with some embodiments of the invention.

FIG. 7, for example, illustrates an example data processing system 450 including a disentangled factor learning network 452. Network 452 may include a disentangled factor learning algorithm 454 that processes petro-technical image data, e.g., 2D or 3D seismic image data 456, to generate a disentangled representation model 458. Model 458 may be, for example, a deep learning model, e.g., a generative model such as a general adversarial network (GAN) model or variational autoencoder (VAE) model, among other types of deep learning models that will be apparent to those of ordinary skill having the benefit of the instant disclosure. The disentangled representations in model 458 may expose attributes of input data helpful for relevant but unknown tasks, and may, in general, expose a set of dimensions for each of a plurality of attributes. Each dimension may be continuous or discrete, and both continuous and discrete attributes may be supported. It will also be appreciated that a disentangled representation in some embodiments can be defined as one where single latent units are sensitive to changes in single generative factors, while being relatively invariant to changes in other factors.

Upon creation of model 458, model 458 may be used for a number of purposes consistent with the invention. For example, model 458 may be used by a classification engine 460 to process new seismic image data 462 and generate therefrom one or more generative factor value(s) 464, e.g., one or more petro-technical features of a subsurface volume, e.g., salt content, rock facies or composition, etc. The values may be values representative of an entire seismic image, or may include values for multiple cells or regions represented by a seismic image. In addition, as noted above, model 458 may be used by a training data generation engine 466 to generate training data 468.

In some embodiments, framework 452 may be based on a framework referred to herein as a JointVAE framework, which is generally based upon Variational Autoencoders (VAEs) and augments a β-VAE framework with a joint latent distribution to learn disentangled continuous and discrete representations in an unsupervised manner. In general, a β-VAE framework models a joint distribution of data x and a set of latent variables z and learns continuous disentangled representations by maximizing the objective function:

$$\mathcal{L}_{(\theta,\phi)} = \mathbb{E}_{q_\phi(z|x)}[\log p_\theta(x|z)] - \beta D_{KL}(q_\phi(z|x) \| p(z)) \quad (1)$$

where the posterior or encoder $q_\phi(z|x)$ is a neural network with parameters $\phi$ mapping x into z, the likelihood or decoder $p_\phi(x|z)$ is a neural network with parameters $\phi$ mapping z into x and, β is a positive constant. The loss is a weighted sum of a likelihood term $\mathbb{E}_{q_\phi(z|x)}[\log p_\theta(x|z)]$, which encourages the model to encode the data x into a set of latent variables z that can efficiently reconstruct the data and a second term that encourages the distribution of the inferred latents z to be close to some prior p(z). When β=1, this corresponds to an original VAE framework; however, when β>1, it is theorized that the increased pressure of the posterior $q_\phi(z|x)$ to match the prior p(z), combined with maximizing the likelihood term, gives rises to efficient and disentangled representations of the data. One can further derive insights by analyzing the role of the KL divergence term in the objective function of Eq. (1). During training, the objective function may be optimized in expectation over the data x. The KL term then becomes:

$$\mathbb{E}_{p(x)}[D_{KL}(q_\phi(z|x) \| p(z))] = I(x;z) + D_{KL}(q(z) \| p(z)) \geq I(x;z) \quad (2)$$

As such, when taken in expectation over the data, the KL divergence term is an upper bound on the mutual information between the latents and the data. Thus, a mini batch estimate of the mean KL divergence is an estimate of the upper bound on the information z can transmit about x.

Penalizing the mutual information term improves disentanglement but comes at the cost of increased reconstruction error. In some instances, the reconstruction quality may be improved without decreasing disentanglement, e.g., by using an objective function where the upper bound on the mutual information is controlled and gradually increased during training. Denoting the controlled information capacity by C, the objective function may be defined as:

$$\mathcal{L}_{(\theta,\phi)} = \mathbb{E}_{q_\phi(z|x)}[\log p_\theta(x|z)] - \gamma |D_{KL}(q_\phi(z|x) \| p(z)) - C| \quad (3)$$

where γ is a constant which forces the KL divergence term to match the capacity C. Gradually increasing C during training allows for control of the amount of information the model can encode. This objective function has been shown to improve reconstruction quality as compared to Eq. (1) generally without reducing disentanglement.

In some embodiments consistent with the invention, a modification may be made to the β-VAE framework to allow for modeling a joint distribution of continuous and discrete latent variables. Letting z denote a set of continuous latent variables and c denote a set of categorical or discrete latent variables, one may define a joint posterior and $q_\phi(z,c|x)$, prior $p(z,c)$ and likelihood $p_\phi(x|z,c)$, resulting in an objective function:

$$\mathcal{L}(\theta,\phi) = \mathbb{E}_{q_\phi(z,c|x)}[\log p_\theta(x|z,c)] - \beta D_{KL}(q_\phi(z,c|x) \| p(z,c)) \quad (4)$$

where the latent distribution is now jointly continuous and discrete. Assuming the continuous and discrete latent variables are conditionally independent, i.e., $q_\phi(z,c|x) = q_\phi(z|x) q_\phi(c|x)$, and similarly for the prior $p(z,c) = p(z)p(c)$, one may rewrite the KL divergence as:

$$D_{KL}(q_\phi(z,c|x) \| p(z,c)) = D_{KL}(q_\phi(z|x) \| p(z)) + D_{KL}(q_\phi(c|x) \| p(c)) \quad (5)$$

i.e., the discrete and continuous KL divergence terms may be separated. Under this assumption, the loss becomes:

$$\mathcal{L}(\theta,\phi) = \mathbb{E}_{q_\phi(z,c|x)}[\log p_\theta(x|z,c)] - \beta D_{KL}(q_\phi(z|x) \| p(z)) - \beta D_{KL}(q_\phi(c|x) \| p(c)) \quad (6)$$

It has been found that directly optimizing this loss can lead to a model ignoring discrete latent variables. Similarly, gradually increasing the channel capacity as in equation (3) has been found to lead to the model assigning all capacity to the continuous channels. To overcome this, the capacity increase C may be split, i.e., the capacities of the discrete and continuous latent channels may be controlled separately to force the model to encode information both in the discrete and continuous channels. The loss may then be given by:

$$\mathcal{L}(\theta,\phi) = \mathbb{E}_{\phi(z,c|x)}[\log p_\theta(x|z,c)] - \gamma |\beta D_{KL}(q_\phi(z|x) \| p(z)) - C_z| - \gamma |\beta D_{KL}(q_\phi(c|x) \| p(c)) - C_c| \quad (7)$$

where $C_z$ and $C_c$ are gradually increased during training.

In addition, in some embodiments, it may be desirable to parameterize continuous variables by parameterizing $q_\phi(z|x)$ by a factorized Gaussian, i.e., $q_\phi(z|x) = \Pi_i q_\phi(z_i|x)$, where $q_\phi(z_i|x) = \mathcal{N}(u_i, \sigma_i^2)$ and let the prior be a unit Gaussian $p(z) = \mathcal{N}(0,1)$. $\mu$ and $\sigma^2$ may both be parametrized by neural networks.

With respect to discrete latent variables, however, parameterizing these variables may be more complex. Since $q_\phi(c|x)$ generally should be differentiable with respect to its parameters, $q_\phi(c|x)$ generally cannot be parameterized by a set of categorical distributions. In some embodiments, a differentiable relaxation of discrete random variables based on the Gumbel Max technique may be used. In particular, if c is a categorical variable with class probabilities $\alpha_1, \alpha_2, \ldots \alpha_n$, then one can sample from a continuous approximation of the categorical distribution by sampling a set of $g_k \sim \text{Gumbel}(0,1)$ i.i.d. and applying the following transformation:

$$y_k = \frac{\exp((\log \alpha_k + g_k)/\tau)}{\Sigma_i \exp((\log \alpha_i + g_i)/\tau)} \quad (8)$$

where $\tau$ is a temperature parameter that controls the relaxation. The sample y is a continuous approximation of the one hot representation of c. The relaxed discrete distribution is referred to as a Concrete or Gumbel Softmax distribution and is denoted by $g(\alpha)$ where $\alpha$ is a vector of class probabilities.

Posterior $q_\phi(c|x)$ may be parameterized by a product of independent Gumbel Softmax distributions, $q_\phi(c|x) = \Pi_i q_\phi(c_i|x)$, where $q_\phi(c_i|x) = g(\alpha^{(i)})$ is a Gumbel Softmax distribution with class probabilities $\alpha^{(i)}$. Prior $p(c)$ may be equal to a product of uniform Gumbel Softmax distributions, allowing a reparameterization technique as disclosed in Diederik P. Kingma and Max Welling, *Auto-encoding variational bayes*, arXiv preprint arXiv:1312.6114, 2013 and Danilo Jimenez Rezende, Shakir Mohamed, and Daan Wierstra, *Stochastic backpropagation and approximate inference in deep generative models*, arXiv preprint arXiv:1401.4082, 2014 to be used to efficiently train the discrete model.

Figure 8:
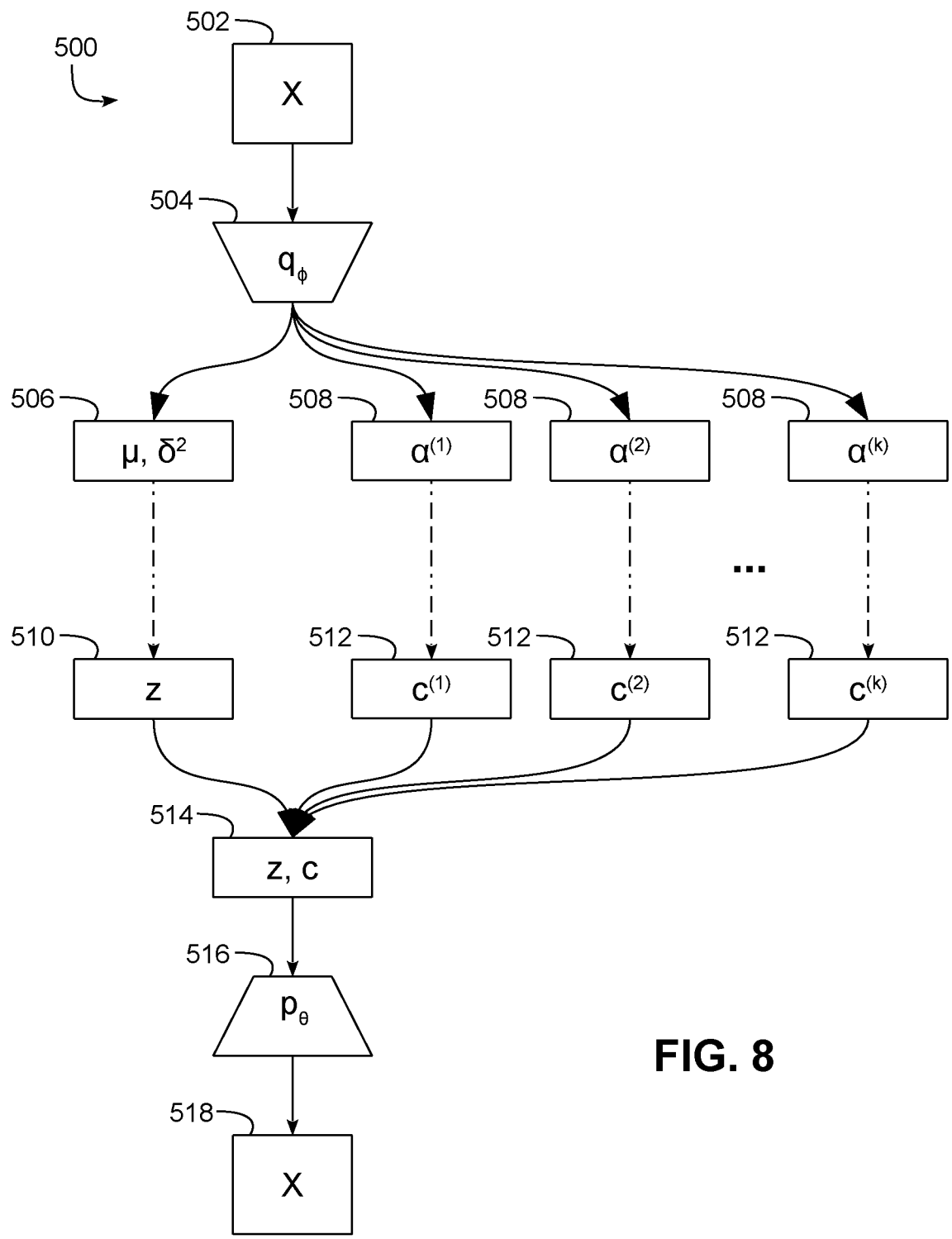
FIG. 8 is a block diagram of a disentangled model architecture consistent with some embodiments of the invention.

An example architecture of a JointVAE model as described herein is illustrated at 500 in FIG. 8. Input data x (block 502) is provided to an encoder 504, which outputs parameters of the continuous distribution $\mu$ and $\delta^2$ (block 506) and each of the discrete distributions $\alpha_{(i)}$ (blocks 508). One may then sample $z_i \sim \mathcal{N}(u_i, \sigma_i^2)$ and $c_i \sim g(\alpha^{(i)})$ using the aforementioned reparametrization technique (blocks 510, 512) and concatenate z and c into one latent vector (block 514) which is passed as input to a decoder (block 516) that outputs at block 518.

It will be appreciated that the loss in Eq. (7) generally depends on the hyperparameters $\gamma$, $C_c$ and $C_z$. While the choice of these hyperparameters in some embodiments may ultimately be empirical, there are various heuristics that can be used to narrow the search. The value of $\gamma$, for example, may be chosen in some embodiments so that it is large enough to maintain capacity at the desired level (e.g., large improvements in reconstruction error should not come at the cost of breaking the capacity constraint). As the capacity of a discrete channel is bounded, $C_c$ may be chosen in some embodiments to be the maximum capacity of the channel, encouraging the model to use all categories of the discrete distribution. $C_z$ may be more difficult to choose in some embodiments, and may be chosen, for example, empirically based upon the largest value where the representation is still disentangled (in a similar way that $\beta$ may be chosen as the lowest value where the representation is still disentangled in β-VAE).

It will also be appreciated that in some embodiments, the herein-described framework provides an inference network $q_\phi(z, c|x)$, which can infer a discrete variable in an unsupervised manner. In some embodiments, accuracy could likely be increased by using some label information; however, since the framework learns several generative factors, the inference network can also be used to infer properties for which no labels exist.

It will therefore be appreciated that a framework, generally based on Variational Autoencoders (VAE), may be used in some embodiments to learn disentangled continuous and discrete representations in an unsupervised manner. The framework generally provides the advantages of VAEs, such as stable training, large sample diversity and a principled inference network, while having the flexibility to model a combination of continuous and discrete generative factors. The framework may be used, for example, to discover independent factors of variation on MNIST, FashionMNIST, CelebA and Chairs data sets, as well as to discover independent factors of variation on various types of petro-technical image data, e.g., seismic data, well logging data, etc. The herein-described framework may therefore be used in some embodiments as a practical application in the petro-technical field, and may further be used in connection with various types of operations, e.g., oilfield operations, that may be performed in the petro-technical field. Oilfield operations may include, for example, production operations, exploration operations, drilling operations, tooling operations, well or field planning operations, well trajectory planning operations and/or monitoring operations, among others.

While particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A computer-implemented method, comprising:
    receiving a set of petro-technical image data representative of a subsurface volume;
    applying a disentangled factor learning algorithm to the set of petro-technical image data to create a disentangled representation model, wherein the disentangled representation model defines a plurality of disentangled representations representative of petro-technical attributes of the subsurface volume, wherein at least one disentangled representation of the plurality of disentangled representations is a discrete disentangled representation and at least one disentangled representation of the plurality of disentangled representations is a continuous disentangled representation;
    analyzing the plurality of disentangled representations representative of the petro-technical attributes of the subsurface volume to determine a disentangled factor;
    making control decisions regarding a subsurface drilling operation based on the determined disentangled factor; and
    actuating a controller to selectively control drilling, weight on bit, or other parameters for the subsurface drilling operation, based on the control decisions made.

2. The method of claim 1, wherein the set of petro-technical image data includes seismic image data collected from the subsurface volume.

3. The method of claim 2, wherein the seismic image data is two-dimensional seismic image data.

4. The method of claim 2, wherein the seismic image data is three-dimensional seismic image data.

5. The method of claim 1, wherein the disentangled factor learning algorithm uses a generative adversarial network.

6. The method of claim 1, wherein the disentangled factor learning algorithm uses a variational autoencoder.

7. The method of claim 1, wherein a first disentangled representation among the plurality of disentangled representations is representative of a salt content.

8. The method of claim 1, wherein a first disentangled representation among the plurality of disentangled representations is representative of a content of a rock facies.

9. The method of claim 1, further comprising processing new petro-technical image data using the disentangled representation model.

10. The method of claim 9, wherein processing the new petro-technical image data using the disentangled representation model includes determining values for one or more generative factors for the new petro-technical image data using the disentangled representation model.

11. The method of claim 9, further comprising generating new training data using the disentangled representation model.

12. The method of claim 1, wherein the disentangled factor learning algorithm uses a variational autoencoder with a joint latent distribution to learn disentangled continuous and discrete representations in an unsupervised manner.

13. The method of claim 12, wherein the disentangled factor learning algorithm includes a first divergent term having a first capacity for continuous latent variables and a second divergent term having a second capacity for discrete latent variables.

14. The method of claim 13, wherein the discrete latent variables and the continuous latent variables are parameterized.

15. The method of claim 14, wherein the discrete latent variables are parameterized using a reparameterization technique.

16. The method of claim 1, wherein the disentangled factor learning algorithm uses an objective function:

$$\mathcal{L}(\theta,\phi) = \mathbb{E}_{q_\phi(z,c|x)}[\log p_\theta(x|z,c)] - \gamma|\beta D_{KL}(q_\phi(z|x)\|p(z)) - C_z| - \gamma|\beta D_{KL}(q_\phi(c|x)\|p(c)) - C_c|,$$

where z is a set of continuous latent variables, c is a set of discrete latent variables, $q_\phi(z|x)$ is a posterior neural network with parameters $\phi$ mapping x into z, $q_\phi(c|x)$ is a posterior neural network with parameters $\phi$ mapping x into c, $p_\phi(x|z, c)$ is a likelihood neural network with parameters $\phi$ mapping z and c into x, $p(z)$ and $p(c)$ are priors, $D_{KL}$ is a divergence term, $\beta$ is a positive constant, and $\gamma$, $C_c$ and $C_z$ are hyperparameters.

17. An apparatus, comprising:
    at least one processing unit; and
    program code configured upon execution by the at least one processing unit to perform the method of:
        receiving a set of petro-technical image data representative of a subsurface volume;
        applying a disentangled factor learning algorithm to the set of petro-technical image data to create a disentangled representation model, wherein the disentangled representation model defines a plurality of disentangled representations representative of petro-technical attributes of the subsurface volume, wherein at least one disentangled representation of the plurality of disentangled representations is a discrete disentangled representation and at least one disentangled representation of the plurality of disentangled representations is a continuous disentangled representation;
        analyzing the plurality of disentangled representations representative of the petro-technical attributes of the subsurface volume to determine a disentangled factor;
        making control decisions regarding a subsurface drilling operation based on the determined disentangled factor; and
        actuating a controller to selectively control drilling, weight on bit, or other parameters for the subsurface drilling operation, based on the control decisions made.

18. The apparatus of claim 17, wherein a first disentangled representation among the plurality of disentangled representations is representative of a salt content or of a content of rock facies.

19. A program product, comprising:
    a non-transitory computer readable medium; and
    program code stored on the non-transitory computer readable medium which when executed by at least one processing unit performs the method of:
        receiving a set of petro-technical image data representative of a subsurface volume;
        applying a disentangled factor learning algorithm to the set of petro-technical image data to create a disentangled representation model, wherein the disentangled representation model defines a plurality of disentangled representations representative of petro-technical attributes of the subsurface volume, wherein at least one disentangled representation of the plurality of disentangled representations is a discrete disentangled representation and at least one disentangled representation of the plurality of disentangled representations is a continuous disentangled representation;

analyzing the plurality of disentangled representations representative of the petro-technical attributes of the subsurface volume to determine a disentangled factor;

making control decisions regarding a subsurface drilling operation based on the determined disentangled factor; and actuating a controller to selectively control drilling, weight on bit, or other parameters for the subsurface drilling operation, based on the control decisions made.

20. The program product of claim 19, wherein a first disentangled representation among the plurality of disentangled representations is representative of a salt content or of a content of rock facies.

* * * * *